United States Patent [19]

Sugawara et al.

[11] Patent Number: 4,697,466
[45] Date of Patent: Oct. 6, 1987

[54] DRIVE DEVICE FOR PRESS

[75] Inventors: Masayoshi Sugawara; Yuichi Nakamura; Akira Matsui, all of Sagamihara, Japan

[73] Assignee: Aida Engineering, Ltd., Sagamihara, Japan

[21] Appl. No.: 726,887

[22] Filed: Apr. 24, 1985

[51] Int. Cl.[4] .............................................. F16H 21/16
[52] U.S. Cl. ........................................ 74/27; 74/67; 74/68
[58] Field of Search ................... 74/67, 68, 27

[56] References Cited

U.S. PATENT DOCUMENTS

| | | | |
|---|---|---|---|
| 2,140,986 | 12/1938 | Drarling | 74/27 |
| 2,779,198 | 1/1957 | Buttner | 74/27 |
| 2,866,409 | 12/1958 | Buttner | 74/27 |
| 2,871,782 | 2/1959 | Buttner | 74/27 |
| 2,886,973 | 5/1959 | Schunemann | 74/27 |
| 2,922,363 | 1/1960 | Dudley | 74/27 |
| 3,155,309 | 11/1964 | Foster | 74/68 |

FOREIGN PATENT DOCUMENTS 626055  8/1961  Canada ................................. 74/68

Primary Examiner—Leslie Braun
Assistant Examiner—Dwight G. Diehl
Attorney, Agent, or Firm—Holman & Stern

[57] ABSTRACT

A drive device for a press wherein a drive device assembly provided with a quick-return mechanism capable of changing its speed characteristic in different degrees is built in a unitary case, each unit case being freely attachable and detachable at the crown center of the press, an output shaft of the drive device has its end portions projecting outwardly from both sides of the unit case and is coupled with a main crankshaft at its end portions through couplings, a main gear located in the unit case is divided into two parts to form a hollow section therebetween, and a link drive an balance weight for the linkage are built in the hollow section.

8 Claims, 5 Drawing Figures

DRIVE DEVICE FOR PRESS

BACKGROUND OF THE INVENTION

1. Field of the Invention

The present invention relates to a drive device for a press.

2. Description of the Prior Art

Most of the drive devices for presses which generate the press slide's ascending and descending movements suited for the press work to be performed by the said press, e.g., rotates a crank shaft to generate the slide's ascending and descending movements with equiangular velocity, or rotates it with a quick-return motion, have been arranged fixedly at a crown portion of the press. Although there are various types of quick-return system drive devices, they are generally for use with a specific press suited only for specific press work and/or have speed and acceleration characteristics exclusively useful for such specific work and have such drawbacks that when employing them in other press work, a separate press suited for this purpose must additionally be equipped, or an existing non-operating press must reluctantly be used.

BRIEF SUMMARY OF THE INVENTION

It is therefore an object of the present invention to eliminate such drawbacks in the prior art and to provide an improved drive device for a press in which the drive device is installed on the crown portion as a freely attachable or detachable unit and various mechanisms are arranged in said unit to thereby make it possible to meet various press works and minimize the equipment cost as well as maximize the production efficiency.

It is another object of the present invention to provide an improved drive device for a press wherein the drive device is a unitized assembly installed freely attachable and detachable at the crown center of the press and a quick-return mechanism having different speed characteristics is incorporated in the unitized assembly to make it possible to perform multifarious press operations and minimize equipment cost and at the same time maximize production efficiency.

It is another object of the present invention to provide an improved drive device for a press wherein the drive device is housed compactly and effectively in a vacant space of the crown center of the press by designing it so that the output shaft ends of the drive device protrude outwardly from both sides of a casing of an attachable-detachable unit and can be coupled with the left and right ends of a main crankshaft of the press through couplings.

It is still another object of the present invention to provide an improved drive device for a press incorporating a compact and easily speed-changeable quick-return mechanism wherein a pinion gear for a drive shaft, sub-crankshaft for an output shaft and two split hollow main gears centered at a point offset from the center of the sub-crankshaft and interlocking with the pinion gear are each freely rotatable in a unit casing, and a pair of gear pins are arranged opposite to each other at an angle of 180° to the main gear and one of the paired gear pins is connected with an eccentric portion of the sub-crankshaft by a linkage, and a balance weight is arranged on another of the paired gear pins to enhance stability.

BRIEF DESCRIPTION OF THE DRAWINGS

The invention will now be described in detail with reference to the accompanying drawings wherein.

DETAILED DESCRIPTION

Figure 1:
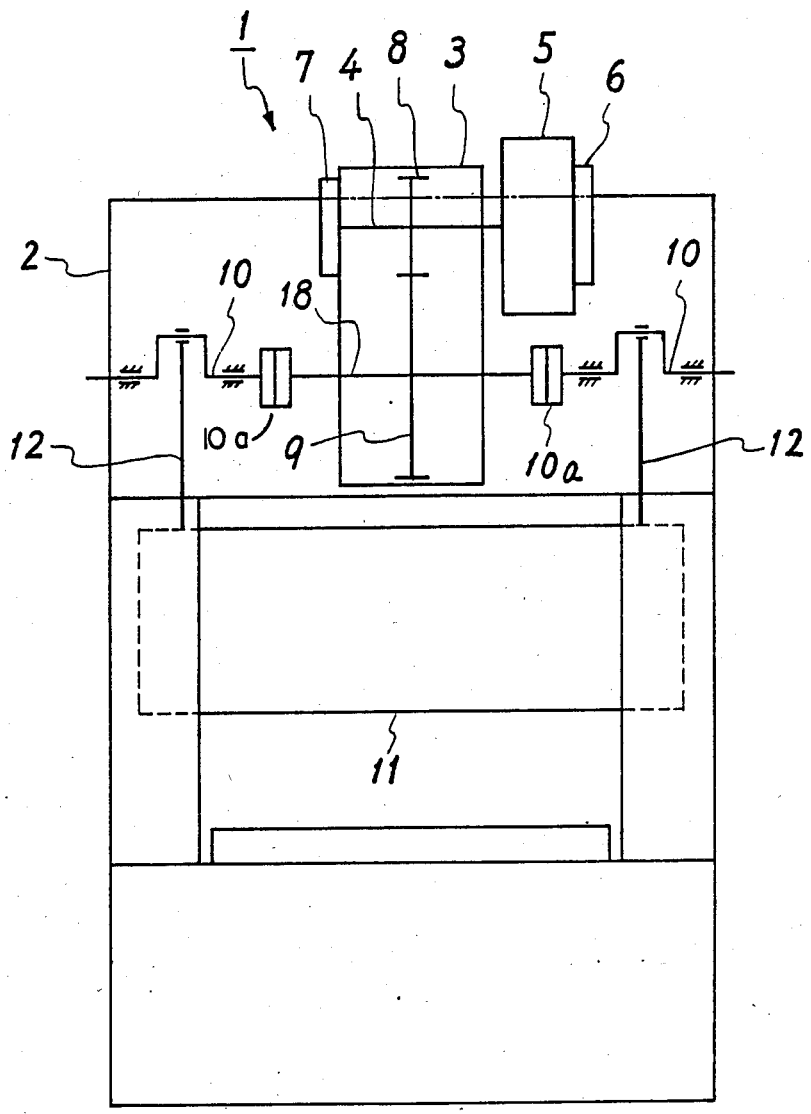
FIG. 1 is a schematic front elevational view of a press provided with an embodiment of the present invention.

With reference to FIG. 1, a unit case 3 in which a drive device is built is fixed in a freely attachable and detachable condition on a crown portion 2 of the press body 1. A drive shaft 4 is supported in a freely rotatable manner in case 3 and, a flywheel 5, clutch 6 and brake 7 are respectively attached to the drive shaft 4. To a central portion of the drive shaft 4, a pinion gear 8 is attached and engaged with a main gear 9. The main gear 9 is supported in the unit case 3 in a freely rotatable manner. Crankshaft 10 of the press 1 are connected to an output shaft 18 of the unit case 3 through couplings 10a. Eccentric portions of the crankshafts are connected with a slide or ram 11 of the press 1 by means of a pair of connecting rods 12. A flywheel 5 is connected with and driven by a main motor (unillustrated) of the press 1. If a clutch 6 is engaged and a brake 7 is released, a rotary force of the flywheel 5 will be transmitted to the drive shaft 4 and, if the clutch 6 is disengaged and the brake is applied, the drive shaft 4 will stop. In the case where a main gear 9 is arranged on the output shaft of the unit case 3, the crankshafts 10 will rotate at an equiangular velocity and allow the press to be used for a crank press, and in the case where the main gear 9 is connected with the output shaft in the manner to be described later the press may be used as a quick return system press. Both ends of the crank shaft 10 protrude to the left and right sides of the crown portion 2 and their outer end portions are used as the output shafts for transmitting the rotary power to ancillary equipment of the press 1.

Figure 2:
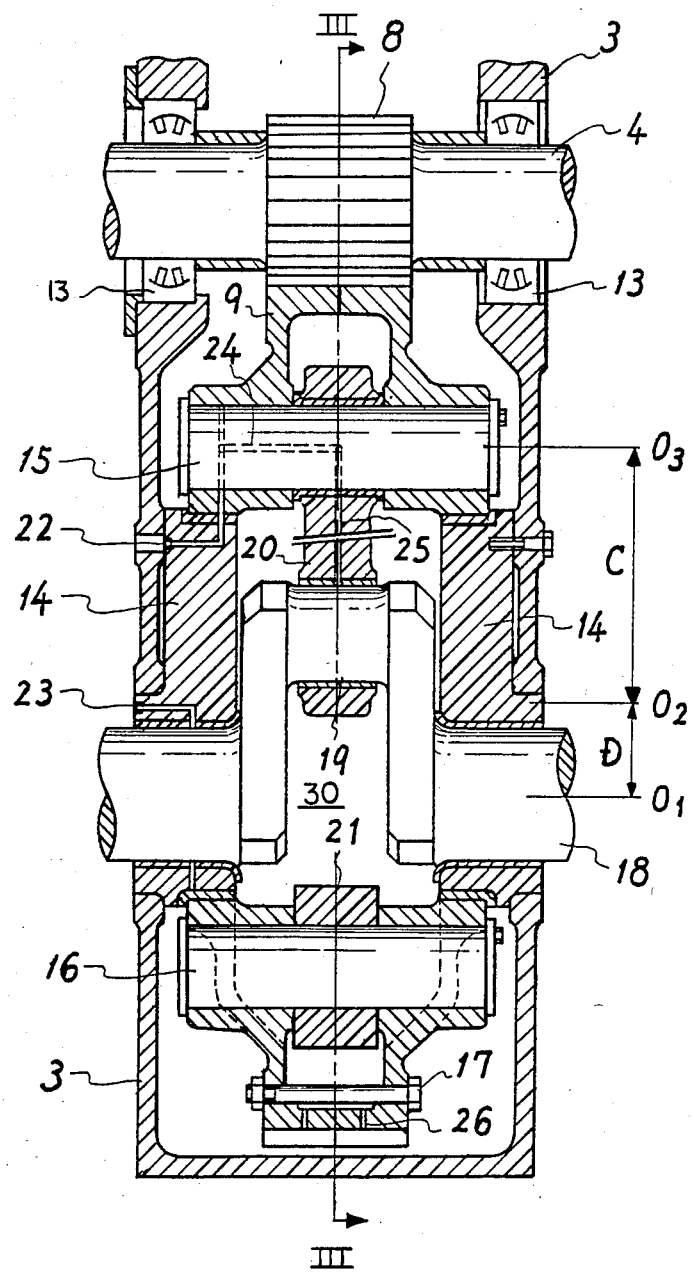
FIG. 2 is a cross-sectional view of the principal part of the invention taken along line II—II of FIG. 3.
Figure 3:
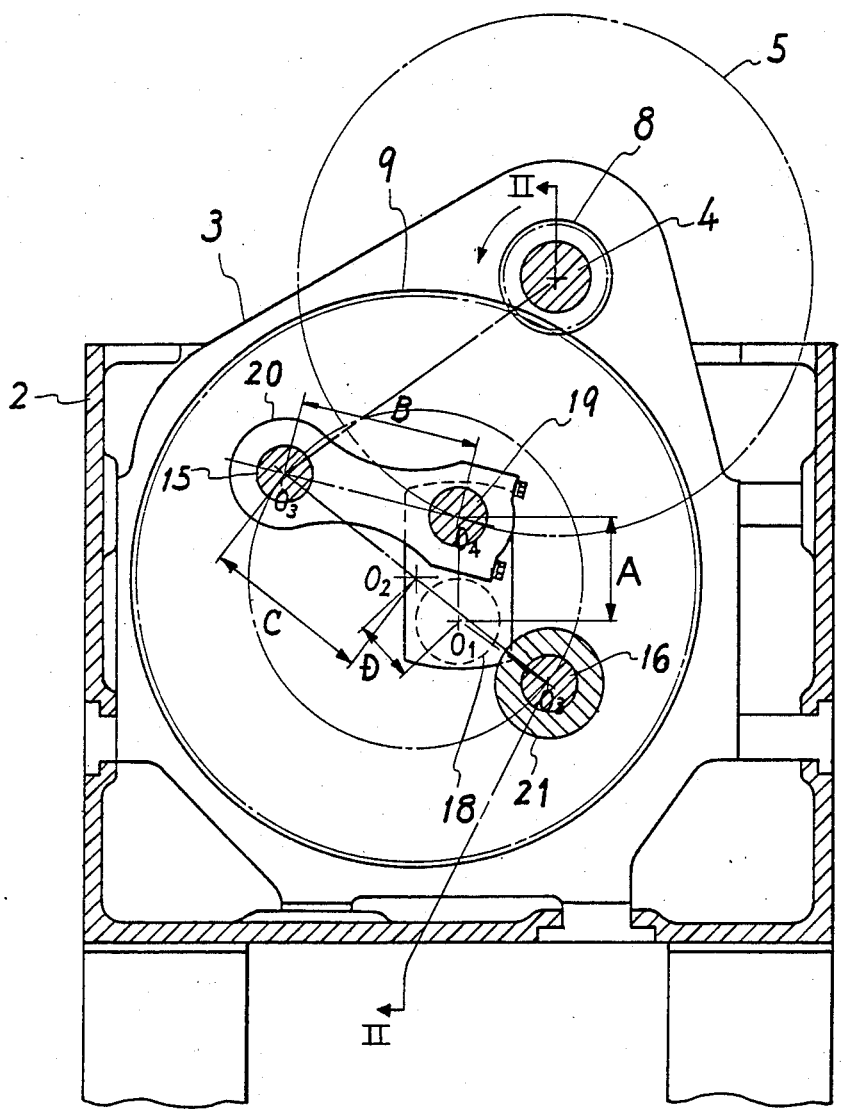
FIG. 3 is a cross-sectional view taken along line III—III of FIG. 2.

Referring then to FIGS. 2 and 3, a structure of the unit case 3 incorporating the quick return mechanism in it is illustrated. On the unit case 3, the drive shaft 4 is supported in a freely rotatable manner by means of roller bearings 13. A pinion gear 8 is attached monolithically to a central portion of the drive shaft 4. A main gear 9 engaging with said pinion gear 8 is supported in a freely rotatable manner by means of a pair of main gear guides 14 fixed to the unit case 3. The structure of the main gear 9 is of a symmetrically divided type held together by a pair of gear pins 15, 16 as well as a plurality of bolts 17 and a hollow section 30 is provided therein. A sub-crankshaft 18 which has a center $O_1$ offset by a distance "D" from a center $O_2$ of the main gear 9 is supported in a freely rotatable manner on the unit case 3. Centers $O_3$ of the gear pins 15, 16 are arranged at 180° with respect to each other on a circumference of a circle having a radius "C" from the center $O_2$ of the main gear 9. An eccentric portion 19 of sub-crankshaft 18 having an eccentric radius "A" is arranged in the aforementioned hollow section 30 of the main gear 9 and is connected with gear pin 15 by means of a link 20 having a center to center distance "B".

On gear pin 16 a balance weight 21 is mounted to reduce an imbalance of the main gear 9 resulting from the link 20 and the eccentric portion 19.

An appropriate quantity of pressurized lubricant is fed to the roller bearings 13 and the oiling ports 22, 23. Oiling ports 22, 23 are also arranged at opposite sides of the main gear 9 but are unillustrated in the drawing. The lubricant from the oiling ports 22, 23 is then fed to lubricate a bearing face between main gear 9 and main gear guide 14, a bearing face between sub-crankshaft 18 and main gear guide 14, a bearing face between gear pin 15 and link 20 through the oil groove 24 of the gear pin 15 and a bearing face between eccentric portion 19 and link 20 through the oil groove 25 of the link 20 and then, flows into the aforementioned hollow section 30 of the main gear 9. In an outer circumference of the hollow section of the main gear 9, oil grooves 26 routing to a tooth bottom are arranged at several points and, the lubricant in the aforementioned hollow section is recycled to the engagement face between pinion gear 8 and main gear 9. This makes it possible to lubricate each section requiring lubrication with a small quantity of the lubricant.

Relative positions between center $O_1$ of the sub-crankshaft 18, center $O_4$ of the eccentric portion 19 and center $O_3$ of the gear pin 15 may be seen in FIG. 3. As shown in the drawing, the main gear 9 runs counterclockwise as the pinion gear 8 turns clockwise. In the state shown in the drawing, an eccentric pin of the crank shaft 10 of the press 1 is at a lower dead center position, i.e., under the center $O_1$ of the sub-crankshaft with respect to center $O_1$, the center $O_2$ is offset 135° in the rotational direction from the eccentric pin's position of crank shaft 10 turned to lower dead center. Accordingly, when the main gear 9 turns clockwise, a compression force is given to the link 20 through the gear pin 15 and at the same time acts to push the eccentric portion 19 of the sub-crankshaft 18, thereby turning the sub-crankshaft 18 clockwise. The angle that the main gear 9 rotates while the sub-crankshaft 18 turns clockwise 180° from the position shown in the drawing is smaller than the angle that the main gear 9 rotates while the sub-crankshaft 18 turns 180° thereafter. As the result, the crank shaft 10 connected to sub-crankshaft 18 has a quick return motion.

Figure 4:
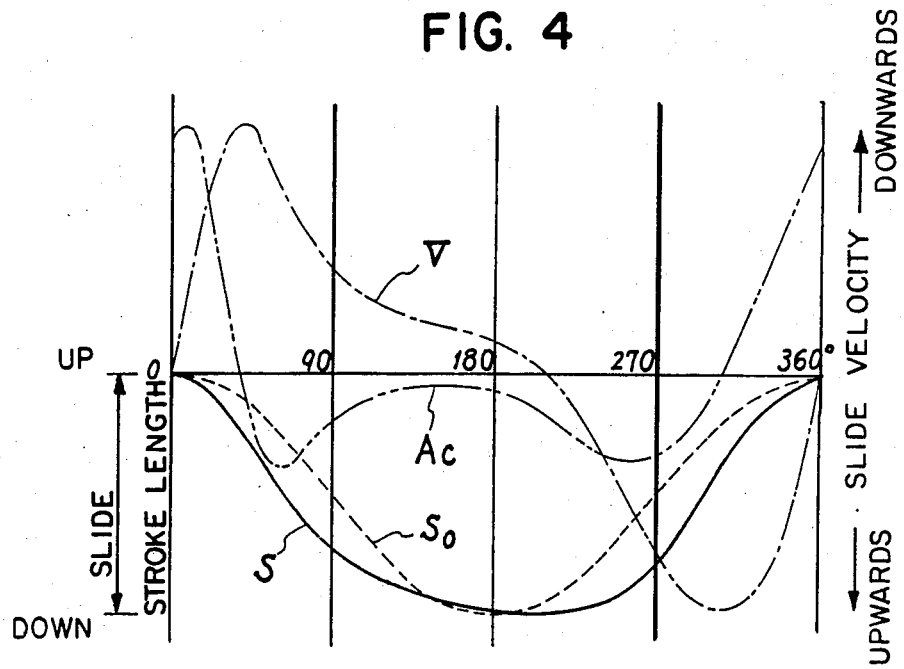
FIGS. 4 and 5 are each a motion diagram relating to stroke, speed and acceleration.
Figure 5:
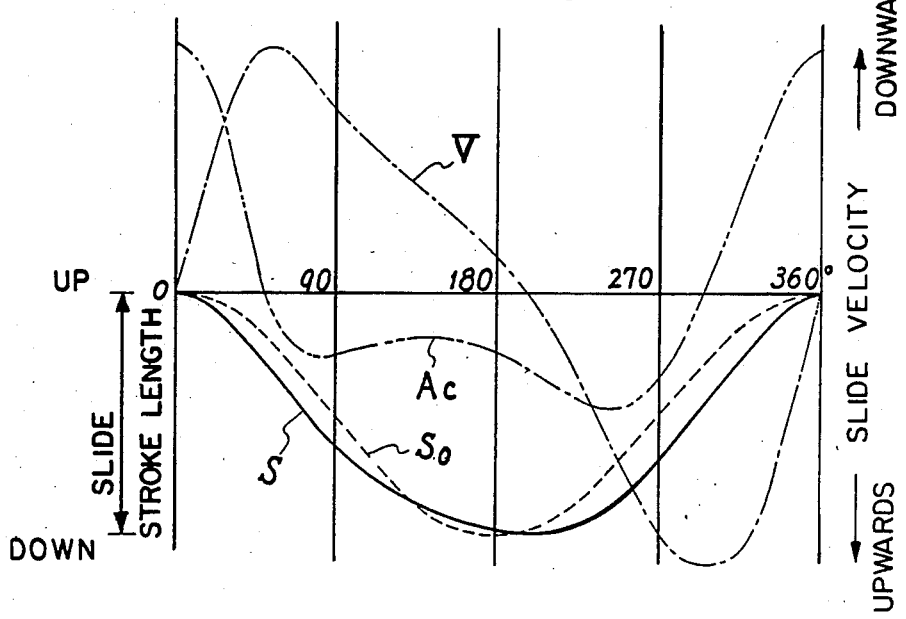

The operation of the present invention will now be described with respect to the action of the drive device. Initially, by changing distance "D" between the center $O_2$ of main gear 9 and the center $O_1$ of sub-crankshaft 18, a mode of the quick return motion will gradually vary and, when the distance "D" equals zero, the mode will accord with that where an engagement of the main gear 9 with the sub-crankshaft 18 is fixed and the crankshaft 10 will run at equiangular velocity. That is, when the distance "D" equals zero, the mode is identical with the case where the center of the main gear 9 is arranged at the center of the crank shaft 18. Therefore, each eccentric portion of the link 20 as well as the sub-crankshaft becomes useless and their structure will be simplified. Each diagram in FIGS. 4 and 5 shows a relationship of the stroke length "S", the velocity "V" and the acceleration "Ac" of the slide 11 to a rotational angle of the main gear 9 in the case where the respective distances "A", "B" and "C" are equalized and the distance "D" is changed. If the maximum stroke length "S" of the slide 11, in either case, is 300 mm, a rotational angle of the main gear 9 to be turned during the descending stroke of the crankshaft 10 will be approximately 208° in FIG. 4 and 197° in FIG. 5. In this way, providing a unit case 3 where the distance "D" is different from that in other unit cases will make it possible to apply the press 1 to various kinds of press works. Also, by arranging an eccentric offset direction of the sub-crankshaft 18 and the crankshaft 10 of 180° with respect to each other, it is possible to reduce an imbalance between both shafts.

As understood from the foregong description, the present invention provides a number of practical effects and advantages that enable providing various presswords with a single press and a saving in the cost of equipment by unitizing and arranging the drive device so that it is freely attachable and detachable on the press and that enable executing the press-work effectively and enhancing the productivity by selecting an optional unit for each operation and also enable making the unit case small and the handling easy by the eccentric portion of sub-crankshaft, link drive and balance weight in the hollow section of the main gear.

We claim:

1. A drive device for a press comprising:
   a press frame;
   a drive shaft;
   a flywheel mounted on said drive shaft;
   a clutch mounted on said drive shaft for engaging and disengaging said drive shaft with a power source;
   a brake mounted on said drive shaft for stopping said drive shaft upon application thereof;
   at least one main crankshaft rotatably mounted on the press frame; and
   a unit drive device assembly comprising,
      a unit casing adapted to be freely attachable and detachable to the press frame at a center of a crown portion of the press, said drive shaft being rotatably mounted on said unit casing,
      an output shaft rotatably mounted in said unit casing, said output shaft having opposite outer end portions projecting outwardly from opposite sides of said unit casing,
      coupling means for coupling and uncoupling at least one of said outer ends of said output shaft to said at least one main crankshaft, and
      a quick-return mechanism within said unit casing operatively interposed between and engaged with said drive shaft and said output shaft for transmitting power from said drive shaft to said output shaft.

2. A drive device as claimed in claim 1 wherein said quick-return mechanism comprises:
   a pinion gear on said drive shaft;
   a main gear rotatably mounted in said unit casing;
   an eccentric crank arm portion on said output shaft in said unit casing, the center of rotation of said output shaft being offset from the center of rotation of said main gear;
   at least one gear pin rotatably mounted in said main gear; and
   a linkage device operatively connecting said at least one gear pin and said crank arm portion of said output shaft so that rotation of said main gear rotates said output shaft in a quick-return manner.

3. A drive device as claimed in claim 2 wherein:
   said unit drive device assembly is interchangeable with at least one other unit drive device assembly, said offset of said center of rotation of said main gear for each unit drive device assembly being different from said at least one other unit drive device assembly, so that said quick-return manner is variable by interchanging said unit drive device assembly with said at least one other unit drive device assembly.

4. A drive device as claimed in claim 2 wherein:

said main gear comprises two parts connectable together, each part having a configuration to provide a hollow interior portion of said main gear when said parts are connected together;

means are provided to connect said two parts together to form said main gear;

said at least one gear pin comprises two gear pins rotatably mounted in said main gear at 180° with respect to each other;

said eccentric crank arm portion is disposed in said hollow interior portion;

said linkage mechanism comprises a drive link member in said hollow interior portion pivotally connected to said eccentric crank arm portion and one of said two gear pins; and a counter-balancing weight member is mounted on the other of said two gear pins.

5. A drive device as claimed in claim 4 wherein:

said unit drive device assembly is interchangeable with at least one other unit drive device assembly, said offset of said center of rotation of said main gear for each unit drive device assembly being different from said at least one other unit drive device assembly, so that said quick-return manner is variable by interchanging said unit drive device assembly with said at least one other unit drive device assembly.

6. A drive device as claimed in claim 4 wherein:

said gear pins have axes of rotation at the same radius with respect to the center of rotation of said main gear;

said center of rotation of said output shaft is at a smaller radius with respect to said center of rotation of said main gear than said radius of said axes of rotation of said gear pins; and said link member is elongated and is connected to said eccentric crank arm and to said one gear pin adjacent the ends of said link member.

7. A drive device as claimed in claim 4 wherein:

said two parts of said main gear are geometrically symmetrical dish-shaped semi-gear parts; and said means to connect said two parts together comprises bolt holes adjacent peripheral portions of said two parts, and bolt means extending through said bolt holes.

8. A drive device as claimed in claim 7 wherein:

said gear pins have axes of rotation at the same radius with respect to the center of rotation of said main gear;

said center of rotation of said output shaft is at a smaller radius with respect to said center of rotation of said main gear than said radius of said axes of rotation of said gear pins; and said link member is elongated and is connected to said eccentric crank arm and to said one gear pin adjacent the ends of said link member.

* * * * *